US012634480B2

(12) United States Patent
Fritsch

(10) Patent No.: US 12,634,480 B2
(45) Date of Patent: May 19, 2026

(54) VIDEO CODING AND DECODING

(71) Applicant: Airbnb, Inc., San Francisco, CA (US)

(72) Inventor: Ramon Fritsch, Sunnyvale, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 18/633,179

(22) Filed: Apr. 11, 2024

(65) Prior Publication Data

US 2025/0324068 A1 Oct. 16, 2025

(51) Int. Cl.
H04N 19/172 (2014.01)
H04N 19/119 (2014.01)

(52) U.S. Cl.
CPC ......... H04N 19/172 (2014.11); H04N 19/119 (2014.11)

(58) Field of Classification Search
CPC ............................ H04N 19/172; H04N 19/119
USPC ...................................................... 375/240.12
See application file for complete search history.

(56) References Cited

U.S. PATENT DOCUMENTS

| | | | | |
|---|---|---|---|---|
| 10,003,802 | B1 * | 6/2018 | Ostiguy | H04N 19/124 |
| 2003/0138043 | A1 | 7/2003 | Hannuksela | |
| 2005/0169371 | A1 * | 8/2005 | Lee | H04N 19/105 |
| | | | | 348/700 |
| 2017/0244962 | A1 | 8/2017 | Roskowski | |

| | | | | |
|---|---|---|---|---|
| 2017/0372494 | A1 * | 12/2017 | Zhu | H04N 19/521 |
| 2018/0139456 | A1 | 5/2018 | Cheok et al. | |
| 2021/0350605 | A1 | 11/2021 | Chen et al. | |
| 2022/0279185 | A1 * | 9/2022 | Zhu | H04N 19/82 |
| 2022/0286666 | A1 | 9/2022 | Zhu | |

OTHER PUBLICATIONS

Zhu et al. "Video Coding with Spatio-Temporal Texture Synthesis and Edge-Based Inpainting", University of Science and Technology of China, 2008 IEEE.*
USPTO—International Search Report and Written Opinion mailed on Jun. 24, 2025 for related International Appl. No. PCT/US2025/022787, 10 pgs.
USPTO—Office Action mailed on May 21, 2025 for related U.S. Appl. No. 18/633,181, 1 page.

* cited by examiner

*Primary Examiner* — James T Boylan
(74) *Attorney, Agent, or Firm* — McDermott Will & Schulte LLP

(57) ABSTRACT

Various aspects of the subject technology relate to systems, methods, and machine-readable media for encoding video data. Various aspects may include identifying keyframes in a source video. Aspects may also include mapping differences between keyframes and consecutive frames in the source video into blocks. Aspects may also include generating an image including the blocks. Aspects may also include storing coordinates of the blocks in the image and corresponding source video information as metadata. Aspects may include compressing the image, the first keyframe, and the metadata into a single compressed file. Aspects may include reconstructing the source video for playback based on the image, keyframes, and metadata in the compressed file.

20 Claims, 11 Drawing Sheets

100

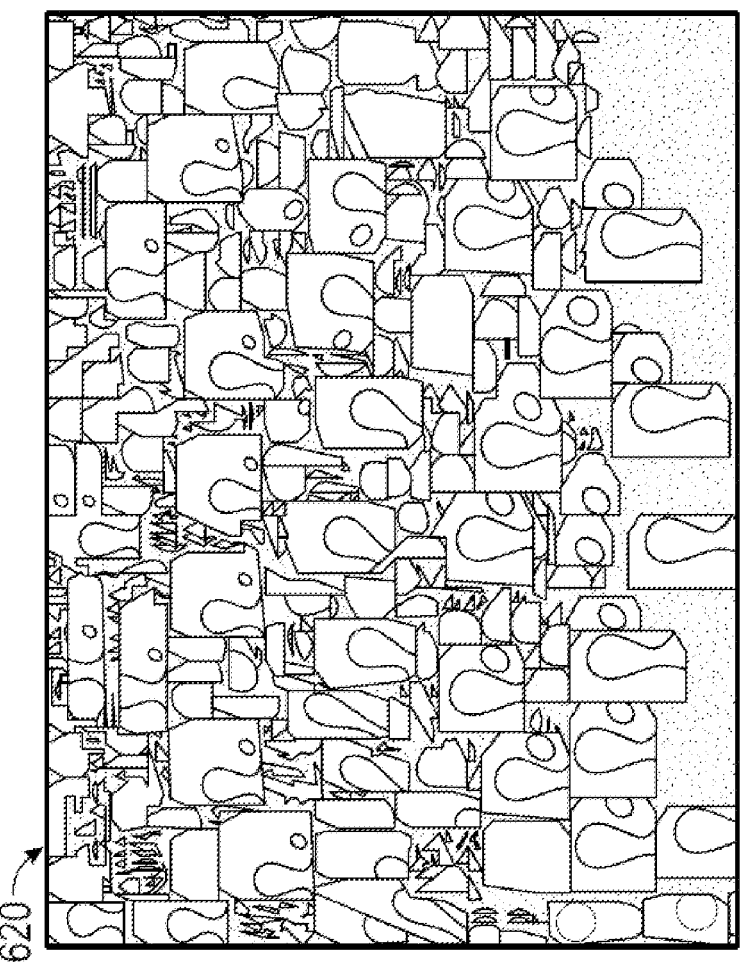
620
FIG. 6A
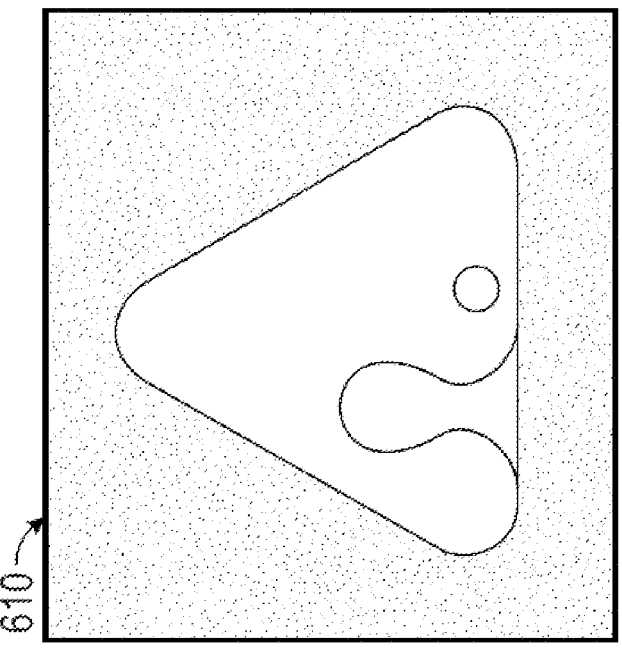
610

700

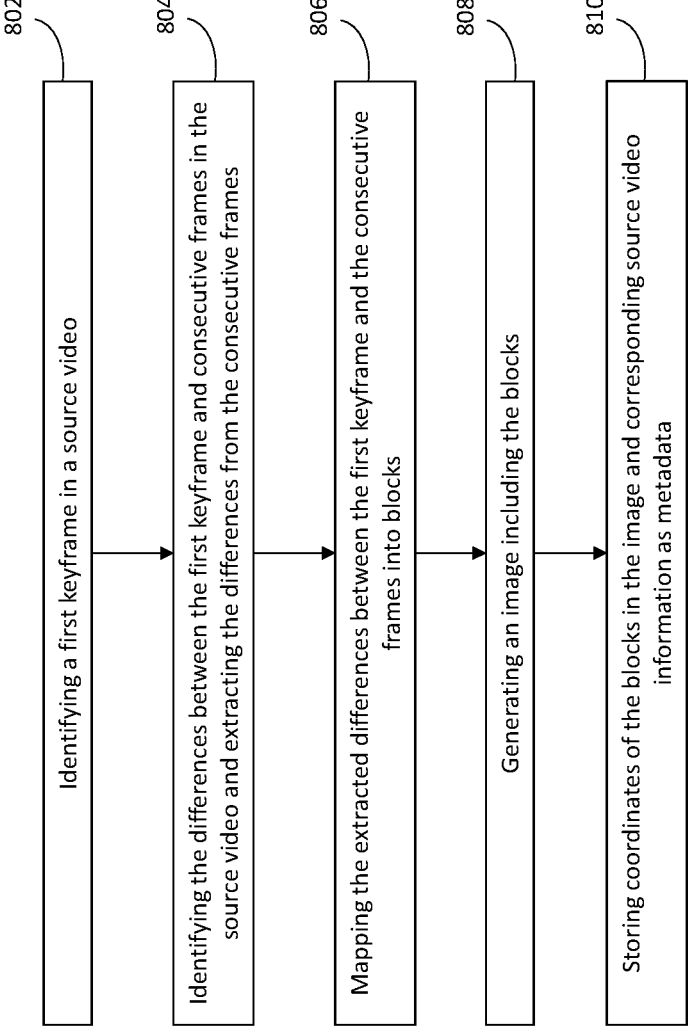

802

Identifying a first keyframe in a source video

804

Identifying the differences between the first keyframe and consecutive frames in the source video and extracting the differences from the consecutive frames

806

Mapping the extracted differences between the first keyframe and the consecutive frames into blocks

808

Generating an image including the blocks

810

Storing coordinates of the blocks in the image and corresponding source video information as metadata

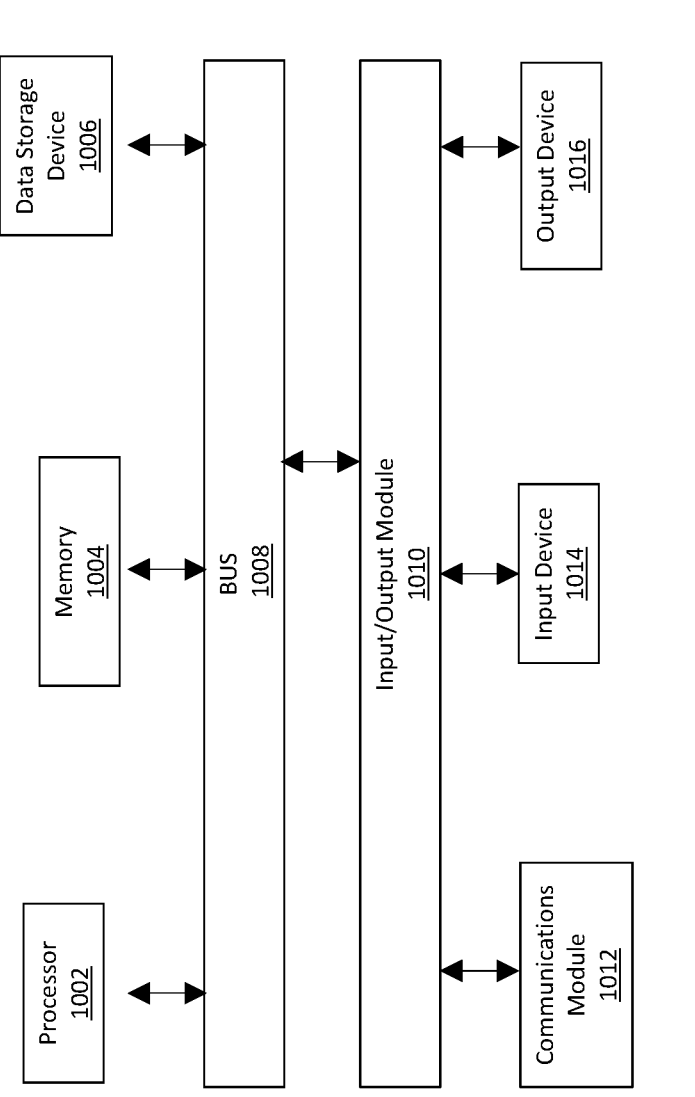
FIG. 10

VIDEO CODING AND DECODING

TECHNICAL FIELD

The present disclosure generally relates to a codec designed for encoding and decoding source data based on image sequences, and more particularly to supporting the delivery and playback of high-quality, alpha-enabled, and artifact-free videos in formats that are compatible across platforms.

BACKGROUND

A video codec may comprise an encoder which transforms or otherwise manipulates input video into a compressed representation suitable for storage and/or transmission. The input video is compressed in order to fit the video data transmission into a bit rate that can be supported by a network the video is being transmitted over. The video codec ensures that the compressed representation remains compact for efficient delivery. The encoder may discard some information in the original input video in order to represent the video in a more compact form. After transmission, a decoder can then uncompress received compressed data back into a viewable form. The codec used to encode the input video needs to be compatible with the codec used to decode the compressed data. The decoded video is then played back on a player, showing the content as closely as possible to the original input video. Traditional video codecs include coding standards, such as the H.264/Advanced Video Coding (H.264/AVC), High-Efficiency Video Coding (HEVC) and Versatile Video Coding (VVC).

BRIEF SUMMARY

The subject disclosure provides for systems and methods for encoding and decoding video data, delivering high-quality, alpha-enabled, and artifact-free videos seamlessly across platforms. The video encoding/decoding harnesses the efficiency of image sequences and identifies differences between frames, enabling compact data files for storing/transmitting purposes.

According to one embodiment of the present disclosure, a computer-implemented method for encoding video data is provided. The method includes identifying a first keyframe in a source video. The method also includes mapping differences between the first keyframe and consecutive frames in the source video into blocks. The method also includes generating an image including the blocks. The method also includes storing coordinates of the blocks in the image and corresponding source video information as metadata. The method also includes compressing the image, the first keyframe, and the metadata into a single compressed file.

According to one embodiment of the present disclosure, a computer-implemented method for decoding video data is provided. The method includes receiving a compressed file associated with a source video, the source video including a sequence of frames. The method also includes reconstructing keyframes included in the compressed file. The method also includes identifying a closest keyframe to a target frame in the sequence of frames. The method also includes extracting blocks based on block coordinates corresponding to the target frame. The method also includes generating a reconstructed frame of the target frame by overlaying the differences onto the closest keyframe. The method also includes generating a reconstructed video of the source video based on a sequence of reconstructed frames corresponding to the sequence of frames.

According to one embodiment of the present disclosure, a system is provided including a processor and a memory comprising instructions stored thereon, which when executed by the processor, causes the processor to: identify a first keyframe in a source video; map differences between the first keyframe and consecutive frames in the source video into blocks; generate an image including the blocks; store coordinates of the blocks in the image and corresponding source video information as metadata; and compress the image, the first keyframe, and the metadata into a compressed file, wherein the compressed file is transmitted to a player for playback.

According to one embodiment of the present disclosure, a non-transitory computer-readable storage medium is provided including instructions (e.g., stored sequences of instructions) that, when executed by a processor, cause the processor to identify a first keyframe in a source video, determine differences between the first keyframe and consecutive frames in the source video, map differences between the first keyframe and the consecutive frames into blocks, generate an image including the blocks, store coordinates of the blocks in the image and corresponding source video information as metadata, and compress the image, the first keyframe, and the metadata into a single compressed file, wherein the compressed file is transmitted to a player for playback.

These and other embodiments will be evident from the present disclosure. It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To easily identify the discussion of any particular element or act, the most significant digit or digits in a reference number refer to the figure number in which that element is first introduced.

FIGS. 6A-6B illustrate another example of image data provided by the codec at the encoding and decoding side, according to one or more embodiments.

FIG. 8 is an example flow diagram for encoding video data, according to certain aspects of the present disclosure.

FIG. 10 is a block diagram illustrating an example computer system with which aspects of the subject technology can be implemented.

Figure 1:
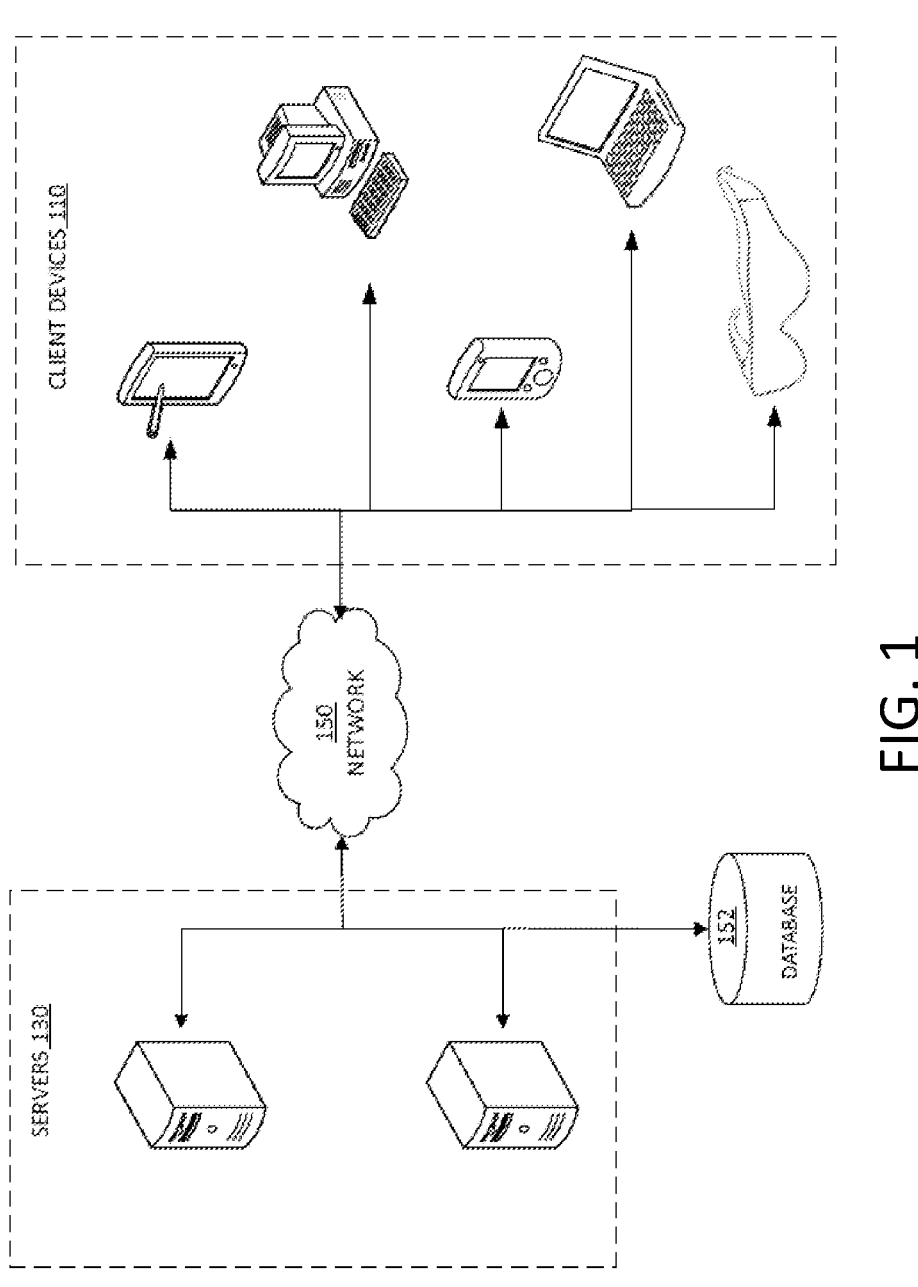
FIG. 1 illustrates a network architecture used to implement video coding, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a thorough understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Codecs are used for compressing and decompressing digital audio and video data. For example, compression begins with a source video which is in a raw, uncompressed format containing a large amount of data. The raw data needs to be compressed for storage and transmission purposes. The raw data is compressed and packaged into a container file format (e.g., MP4, MOV, and AVI) containing binary data streams representing video/audio codecs and other components of the source video (e.g., metadata and other multimedia elements). The container file format (hereafter referred to simply as "file format") determines how the compressed video data is stored and transmitted. Video data may be compressed and decompressed using codecs within different file formats, ensuring compatibility and efficient playback across various devices and platforms.

Different container file formats are compatible with different codecs and playback devices. Therefore, container file formats compatible with a codec used to encode a source video at a sending device needs to be compatible with the codec used to decode the compressed data at the playback device. Traditional video encoding standards allow for a single file format to support multiple codecs depending on user requirements and/or the playback device. While various standard codecs are suitable for different container file formats, there is no single format that works across platforms. This can substantially limit certain features on, for example, platforms without built-in support for any video or media format. By non-limiting example, one of a codec or a platform used for playback may support a transparency feature (i.e., alpha channel support) while the other does not support the feature (e.g., may not decode the alpha channel). Traditional codecs may use central processing units (CPUs) for executing the compression or decompression. This process requires computational power from the CPU to handle tasks like motion estimation, quantization, entropy coding, and other operations involved in video compression and decompression. Therefore, the efficiency of a codec and the performance of the CPU can impact the speed and quality of video processing and rendering.

Embodiments, as disclosed herein, provide a solution rooted in computer technology to the above-described technical problem in video encoding, namely, by providing a codec for encoding (compressing) and decoding (decompressing) video data using a compressed file format including metadata. The codec can deliver compressed video data in different file formats which are compatible with various platforms (e.g., web browsers, desktop operating systems, mobile operating systems, or the like). The different file formats may be packaged into a single delivery file format. The video encoding achieves exceptional results with significantly reduced asset sizes in the delivery file format. Platforms may have specific guidelines or limitations regarding asset sizes to ensure optimal performance and compatibility during video encoding and delivery. By compressing assets effectively during encoding, the codec can achieve compatibility with all platforms.

According to embodiments, video data can be encoded in any standard file format. Another aspect of embodiments may include a player or device for playback. The codec encodes raw data from, for example, a source video for transmission to the player. The encoded data is sent to the player where the codec can decode the compressed data and playback a decoded video on the player. The codec eliminates compression artifacts, ensuring a crisp and clear video playback experience at the player.

According to embodiments, the codec may leverage graphical processing units (GPUs) to achieve fast and efficient frame rendering without imposing excessive processing demands, for example, on the CPU and improving performance results of the codec while reducing processing costs.

According to embodiments, the different file formats store compressed data along with corresponding metadata. The compressed data contained in the file formats are not limited to, for example, binary data streams representing video and audio codecs. According to embodiments, the compressed data may include a sequence of images representing differences between a keyframe and subsequent frames in the source video. For example, the codec may compress the differences into a sequence of one or more images including metadata associated with the source video and the sequence of images extracted therefrom. The compressed data along with the metadata may be packaged in a given file format. The codec decompresses the compressed data, and the source video is reconstructed at the player based on the sequence of images in the given file format by overlaying the differences onto the keyframe to reconstruct frames of the source video.

According to embodiments, the codec includes alpha channel support for seamless integration of videos with transparency information through the use of alpha channels, enabling smooth overlays on dynamic backgrounds. The alpha channel data may be included in an alpha layer that represents the transparency levels of each pixel in the video. The transparency levels may be represented as, for example, a percentage of transparency (or opacity) of each pixel. Per pixel transparency levels enables the reconstruction of video data with varying degrees of transparency. The codec can effectively encode and decode videos with transparent areas or overlays using the alpha layer.

According to embodiments, the player can render frames over time. In some implementations, rendering of the decoded video can be controlled by the user at the player. The player can be controlled from creative inputs including, but not limited to, scroll position, mouse position (e.g., over the rendered video, across a user display, or the like), accelerometer, etc.

Aspects of embodiments are described with reference to encoding a source video file and decoding for playback. The playback video format may include, but is not limited to, short, rasterized animations, animations with a transparency layer, videos including assets with dynamic backgrounds, graphics interchange formats (GIFs)/GIF replacements, or the like.

Several implementations are discussed below in more detail in reference to the figures.

Example Architecture

FIG. 1 illustrates a network architecture 100 used to implement video coding, according to some embodiments. Architecture 100 may include server(s) 130 and a database 152, communicatively coupled with one or more client devices 110 via a network 150. Any one of servers 130 may host a platform, service, or application running on client devices 110, used by one or more of the participants in the network. Servers 130 may include a cloud server or a group of cloud servers. In some implementations, servers 130 may not be cloud-based (i.e., platforms/applications may be implemented outside of a cloud computing environment) or may be partially cloud-based. Client devices 110 may include any one of a laptop computer, a desktop computer, or a mobile device such as a smart phone, a handheld device, video player, or a tablet device.

In some embodiments, client devices 110 may include a headset or other wearable device (e.g., a virtual reality or augmented reality headset or smart glass). In various implementations, client devices 110 can communicate over wired or wireless channels to distribute processing and/or share data. Architecture 100 can create, administer, and provide interaction modes for a shared artificial reality environment (e.g., collaborative artificial reality environment) at client devices 110, such as for communication via XR or other communication elements. The interaction modes can include various modes for various audio conversation, textual messaging, communicative gestures, control modes, and other communicative interaction, etc. for each user of the client devices 110.

The database(s) 152 may store backup files from the platform required to run software including, for example, specific operating systems, CPU types, or installed software libraries that enable the execution of various programs on client devices 110. The database(s) 152 may logically form a single unit or may be part of a distributed computing environment encompassing multiple computing devices that are located within their corresponding server, located at the same, or located at geographically disparate physical locations. For example, various information related to a source video file may be stored in the database(s) 152 and may comprise information such as a format of the video, duration, encoding specifics, metadata, and/or the like.

Network 150 can include, for example, any one or more of a local area network (LAN), a wide area network (WAN), the Internet, a mesh network, a hybrid network, or other wired or wireless networks. Further, network 150 can include, but is not limited to, any one or more of the following network topologies, including a bus network, a star network, a ring network, a mesh network, a star-bus network, tree or hierarchical network, and the like. Network 150 may be the Internet or some other public or private network. Client computing devices can be connected to network 150 through a network interface, such as by wired or wireless communication. The connections can be any kind of local, wide area, wired, or wireless network, including the network 150 or a separate public or private network.

Figure 2:
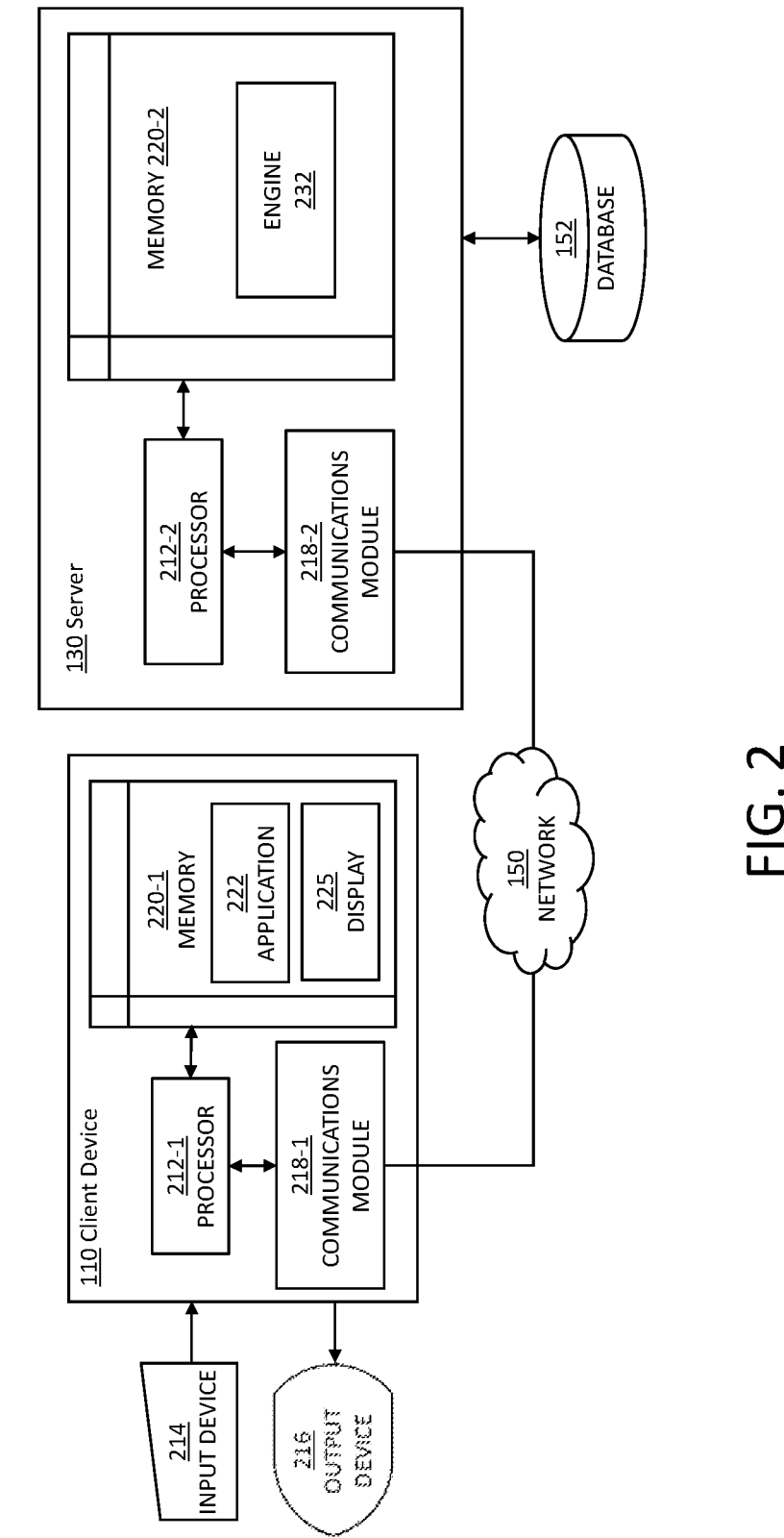
FIG. 2 is a block diagram illustrating details of devices used in the architecture of FIG. 1, according to some embodiments.

FIG. 2 is a block diagram 200 illustrating details of a client device 110 and server 130 used in a network architecture as disclosed herein (e.g., architecture 100), according to some embodiments. Client device 110 and servers 130 are communicatively coupled over network 150 via respective communications modules 218-1 and 218-2 (hereinafter, collectively referred to as "communications modules 218"). Communications modules 218 are configured to interface with network 150 to transmit or receive information, such as user data, messaging history, user input data, and/or the like to other devices on the network 150. Communications modules 218 can be, for example, modems or Ethernet cards, and may include radio hardware and software for wireless communications (e.g., via electromagnetic radiation, such as radiofrequency—RF—, near field communications—NFC—, Wi-Fi, and Bluetooth radio technology).

Client device 110 may incorporate a codec and be configured to receive video data for encoding/decoding. In some implementations, the client device 110 may incorporate a player configured to playback decoded video/image data. Client device 110 may be coupled with an input device 214 and with an output device 216. A user may interact with client device 110 via the input device 214 and the output device 216. Input device 214 may include a mouse, a keyboard, a pointer, a touchscreen, a wearable input device (e.g., a haptics glove, a bracelet, a ring, an earring, a necklace, a watch, etc.), a microphone, a controller, a joystick, a virtual joystick, a camera, a touchscreen display that a user may use to interact with client device 110, or the like. In some implementations, the user controls video rendering using the input device 214 (e.g., via a scroll feature or mouse movements). In some embodiments, input device 214 may include cameras, microphones, and sensors, such as touch sensors, acoustic sensors, inertial motion units—IMUs—and other sensors configured to provide input data. Output device 216 may include a screen display (e.g., an LCD display screen and/or LED display screen), a touchscreen, a speaker, a projector, holographic, or augmented reality display (such as a heads-up display device or a head-mounted device), and/or the like. According to embodiments, the client device 110 may be used to scan a target user and retrieve data associated with the target user from the client device or an external data source.

Client device 110 may also include a processor 212-1, configured to execute instructions stored in a memory 220-1, and to cause client device 110 to perform at least some operations in methods consistent with one or more embodiments and some operations are offloaded to a core processing component or server 130. Memory 220-1 may further include an application 222 and a display 225, configured to run in client device 110 and couple with input device 214 and output device 216. The application 222 may be downloaded by the user from servers 130 and may be hosted by servers 130. The application 222 includes specific instructions which, when executed by processor 212-1, cause operations to be performed according to methods described herein. In some embodiments, the application 222 runs on a platform, for example, an operating system (OS) installed in client device 110. In some embodiments, application 222 may run out of a web browser. In some embodiments, the processor is configured to control a graphical user interface (GUI) or display 225 for the user of one of client devices 110 accessing the server of the platform. Data and files associated with the application 222 may be stored in database(s) 152. Client device 110 may include a codec being a hardware device or computer software configured to encode or decode a digital data stream or signal.

Servers 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." In some implementations, the servers 130 can be used as part of a social network/platform implemented via the network 150. Processors 212 (e.g., CPUs, GPUs, holographic processing units (HPUs), etc.) are configured to execute instructions stored in memories 220. The processors 212 can be a single processing unit or multiple processing units in a device or distributed across multiple devices (e.g., distributed across two or more of client device 110s). The processors 212 can be coupled to other hardware devices, for example, with the use of an internal or external bus, such as a PCI bus, SCSI bus, wireless connection, and/or the like. The processors 212 can communicate with a hardware controller for devices, such as input device 214 and output device 216.

Memories 220 includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. Memories 220 are not propagating signals divorced from underlying hardware; a memory is thus non-transitory. The memories 220 can include program memory that stores programs and software. The memories 220 can also include data memory that can include information to be provided to the program memory or any element of the network.

Memory 220-2 may include an engine 232. The engine 232 may share or provide features and resources to display 225, including multiple tools associated with text, image or video collection, capture, design applications that use images or pictures retrieved (e.g., at application 222), content rendering to a user of client device 110. The user may access information from engine 232 through application 222, installed in a memory 220-1 of client device 110. Accordingly, application 222, including display 225, may be installed by servers 130 and perform scripts and other routines provided by servers 130 through any one of multiple tools. Servers 130 may include an application programming interface (API) layer, which controls applications in the client device 110. API layers may also provide tutorials to users of the client device 110 as to new features in the application 222. Engine 232 may include one or more set of machine-readable instruction modules (e.g., later described with reference to system 700 in FIG. 7) that, when executed by processors 212, are configured to perform operations according to one or more aspects of embodiments described herein.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

The techniques described herein may be implemented as method(s) that are performed by physical computing device (s); as one or more non-transitory computer-readable storage media storing instructions which, when executed by computing device(s), cause performance of the method(s); or as physical computing device(s) that are specially configured with a combination of hardware and software that causes performance of the method(s).

Figure 3:
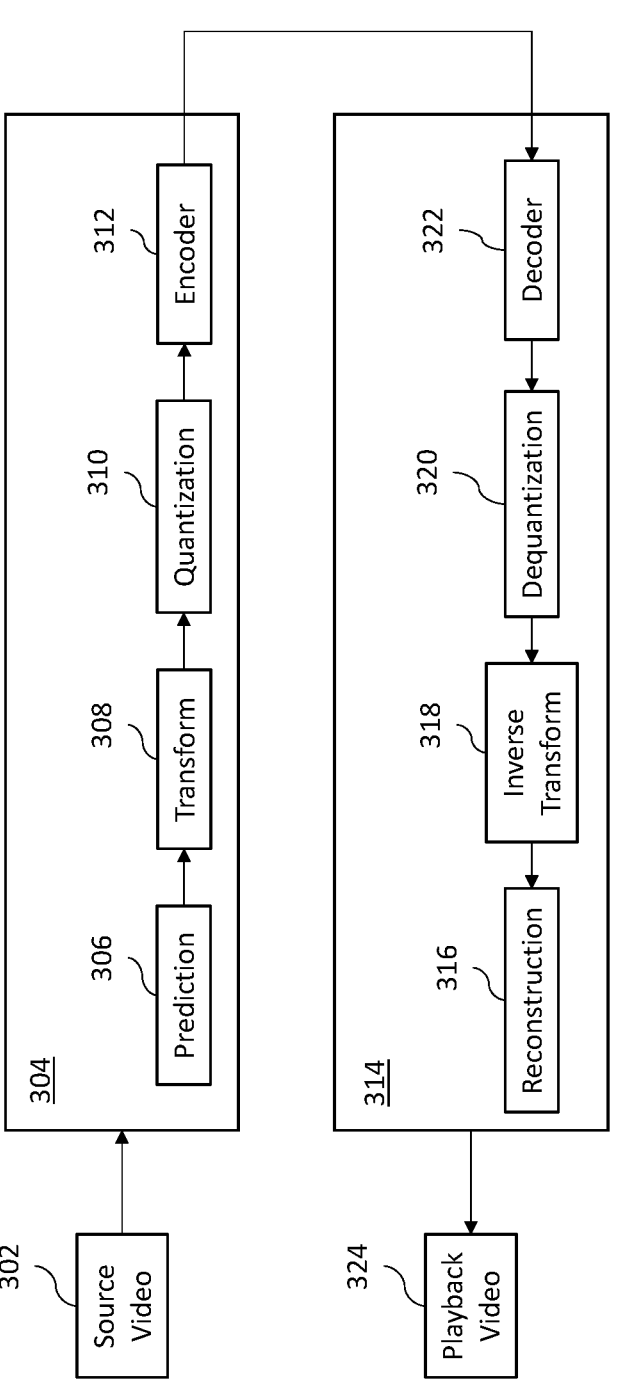
FIG. 3 is a block diagram illustrating an overview of a codec framework used for encoding and decoding video data, according to one or more embodiments.

FIG. 3 is a block diagram illustrating a codec framework 300 for encoding and decoding video data. The operations described in FIG. 3 may be performed by one or more of the components detailed in FIG. 2. By non-limiting example, at least a portion of the operations may be performed at client device 110.

A source video 302 may be uploaded, captured (e.g., in real time), or input to a video encoder (or codec) 304 at a user device (e.g., client device 110). The source video 302 may include an input video and/or audio. The encoding apparatus 304 performs an encoding process to converts the source video 302 into a compressed format. The encoding apparatus 304 may first process the source video 302 by dividing the source video 302 into a plurality of images where each image may be an entire frame or a micro-block in an image frame (e.g., a Coding Tree Unit (CTU)).

The prediction 306 forms a predication for each block based on, for example, pixel information of previously reconstructed inputs. The previously reconstructed inputs may include reconstructed inputs from multiple previous encoding cycles at encoding apparatus 304. In some implementations, the prediction is determined using intra prediction which exploits spatial redundancies within a single video frame by predicting the current block of pixels from neighboring, already-encoded pixels within the same frame. In some implementations, the prediction is determined using inter prediction which exploits temporal redundancies between consecutive video frames by predicting the current frame based on previously encoded/decoded reference frames.

Transform 308 converts a block of residual samples between the source video 302 and the predication for each block from the spatial domain to the frequency domain using, for example, Discrete Cosine Transform (DCT) or Discrete Wavelet Transform (DWT). The transform 308 outputs a set of coefficients which are quantized at quantization 310. Quantization 310 reduces the precision of the transform set of coefficients according to a quantization parameter (QP), reducing redundancy in the video data. The video data may be further compressed using entropy encoding techniques (e.g., Huffman coding or Arithmetic coding), further removing remaining redundancies in the video data.

Encoder 312 compresses the quantized transform coefficients into a compressed bitstream including information that enables a decoder to re-create the predictions (e.g., motion vector information), structure and format of the compressed video frames, etc. The compressed bitstream may then be packaged into a container file format (also referred to as "compressed file") along with added metadata and stored or transmitted over a network (e.g., network 150) for playback.

A player (e.g., client device 110) may include a decoding apparatus 314 that performs a decoding process. The decoder 322 receives the compressed bitstream and extracts the information from the compressed bitstream (e.g., quantized transform coefficients, prediction information, etc.) and decodes the bitstream for playback of the source video 302. The transform coefficients are dequantized at dequantization 320. The inverse transform 318 performs inverse transformations using, for example, Inverse Discrete Cosine Transform (IDCT) based on the dequantized coefficient to obtain recovered residuals, recreating each of the block residuals. The blocks may be combined to form a residual macroblock.

Reconstruction 316 forms an identical prediction to the one created by the prediction 306 for each macroblock. The recovered residual is added back to the prediction to obtain a reconstructed block which can be displayed as part of a reconstructed video frame making up playback video 324. Each video frame is played in sequence when outputting the playback video 324. Additional components may be used to improve the visual quality of the reconstructed video frame, including but not limited to, Deblocking Filter (DF), a Sample-Adaptive Offset (SAO), one or more loop filters, etc.

Embodiments described herein provide improvements to video data compression using a codec that effectively compresses necessary information from raw video files during the encoding stage to achieve compatibility with all target platforms. This addresses the technical challenge of ensuring video content can be seamlessly played back across a diverse range of devices and platforms. The codec described, according to embodiments, provides a comprehensive solution to the technical challenges in video encoding and delivery. The codec facilitates efficient compression, supports a wide range of file formats, ensures compatibility across various platforms, and delivers high-fidelity, high-quality outputs with the added capability of alpha channel support.

Figure 4:
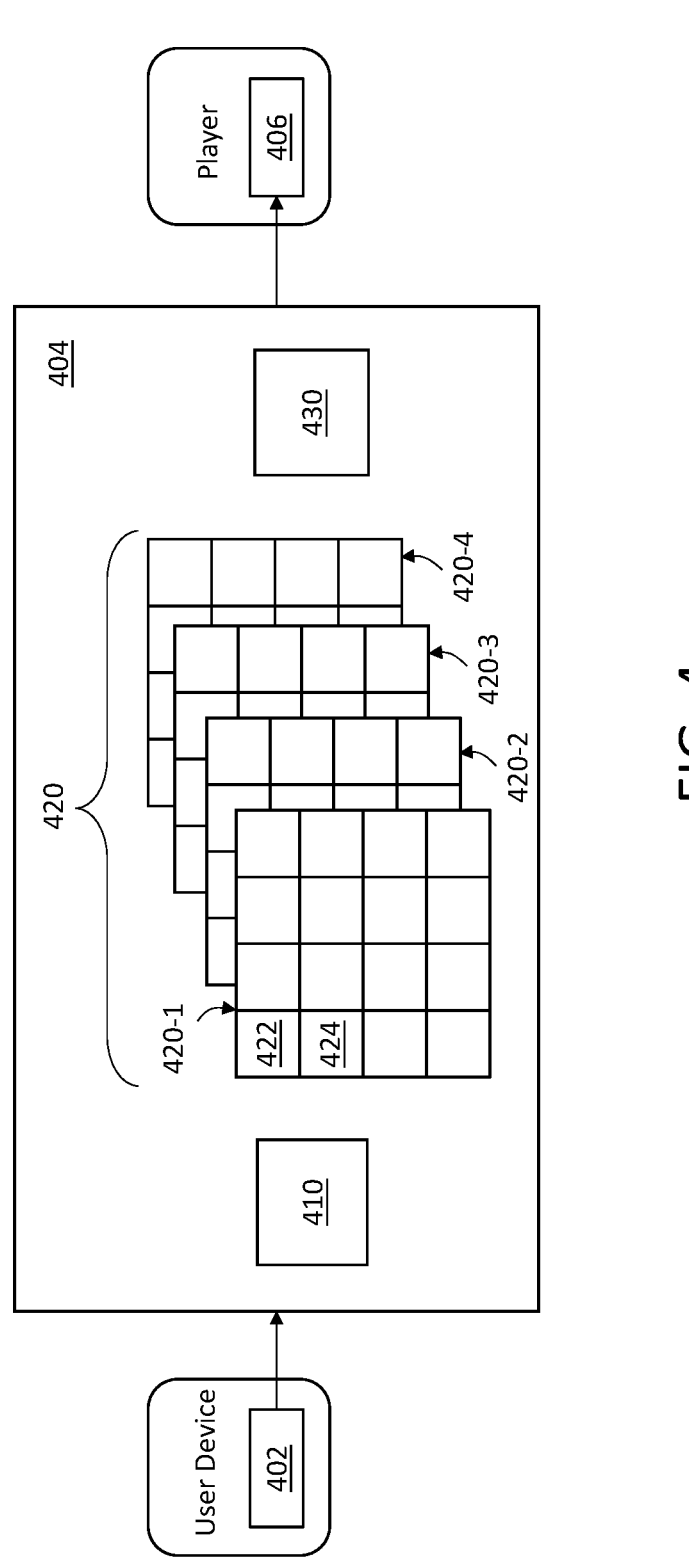
FIG. 4 illustrates an exemplary configuration of image information in a compressed file produced by a codec, according to one or more embodiments.

FIG. 4 illustrates an exemplary configuration 400 of image information in a compressed file produced by a codec, according to one or more embodiments. The codec may be configured to compress a source video at a user device for storage and/or transmission and decompress the compressed file at a player for playback. One or more aspects of FIG. 4 may be described with reference to one or more aspects of FIG. 3.

An encoder (e.g., encoding apparatus 304) of a first codec 402 at a user device employs an encoding algorithm based on an analysis of differences between consecutive frames in the source video. The source video may include a number of frames and each of the frames may be divided into blocks. The blocks may range in size (e.g., 4×4 or 16×16 pixels). Different block sizes will produce different asset sizes (i.e., compressed file sizes). The block size may be customizable by the codec or the user device based on, for example, a size of the source video. By non-limiting example, if the source video exceeds a predetermined number of frames, the block size may be increased by ratio relative to the number of frames surpassing the predetermined number of frames.

The first codec 402 produces a compressed file 404 of static images and metadata describing source frame information and block coordinates. The compressed file 404 may include a first frame 410 of the source video, diff images 420, and metadata 430. In some implementations, the compressed file 404 starts with a static keyframe (e.g., the first frame 410 in FIG. 4). During the encoding process, the first codec 402 identifies differences between successive frames and maps them into the blocks. The blocks contain dynamic elements representing the identified differences. In some implementations, the blocks are grouped together into larger render blocks (or macroblocks), adjusting the encoding block size and minimizing the number of draw calls during render time.

Referring to FIG. 4, for a source video, the first codec 402 may generate diff images 420. The diff images 420 are differential images that act as a directory of frame differences identified in the source video. According to embodiments, the diff images 420 may be sprites or two-dimensional (2D) bitmaps representing frame differences. The diff images 420 may include one or more sequences of images. The blocks comprising the identified differences are extracted and placed into the diff images. The diff images store the blocks in a compact way to reduce the amount of diff images necessary to produce the compressed file 404 and reconstruct the source video. Each block may be indexed and/or associated with a coordinate corresponding to a source video frame. Each of the video frames may be indexed. The image information including, for example, block coordinates and index value of the corresponding source frame, are included in the compressed file 404 as metadata 430 (or metadata file).

According to embodiments, the diff images 420 are generated based on differences between the first frame 410 (i.e., a first keyframe) and each subsequent frame in the source video. Diff images 420 may include one or more images (e.g., image 420-1, 420-2, 420-3, 420-4) with compressed blocks representing the differences between frames. The differences are extracted and mapped to blocks and placed in an image (e.g., one of diff images 420). In some implementations, differences in each frame are mapped to variable macroblock sizes. The first codec 402 may only record, in the diff images 420, the block-level differences between the frames and discard redundancies between frames. The first codec 402 writes, for each block, the block coordinates and source frame information into metadata 430. For example, the codec may only identify differences between the first frame 410 and a second frame such that the differences are mapped to block 422 and block 424. The blocks 422 and 424 are extracted and placed in diff image 420-1. Coordinate information of blocks 422 and 424 and source frame information of the second frame (e.g., frame number or index value) are maintained in metadata 430. Each of the frames in the source video may be associated with a diff image including one or more blocks mapping the differences between each of the frames and at least one keyframe identified for the source video.

According to embodiments, the codec supports alpha channel preservation. The alpha channel information may be encoded alongside the image data (e.g., RGB color data), allowing for the preservation of transparency during the video encoding process and rendering transparency information in a final video output. By non-limiting example, the source video may include an object(s) with a transparent background.

By compressing sprites (i.e., the sequence of 2D diff images), the necessary information required to reproduce any given frame of the source video, the encoding process becomes highly efficient and enables high-fidelity, high-quality video playback with a minimal compressed file size. This is achieved because the codec does not need to store unnecessary blocks that have no changes between frames, further optimizing the compression efficiency. The codec's ability to produce smaller media sizes provides the additional advantage of ensuring compatible performance across any given device or platform.

The diff images 420, the first frame 410, and metadata 430 are compressed and packaged into a single delivery file (e.g., a single binary format) with a proprietary format and stored/transmitted via a network (e.g., network 150) to the player. The proprietary format allows the sprites to be encoded and decoded using any standard image format, making the compressed file 404 universally compatible across all platforms. Blocks of information in the diff image also enable the player to reconstruct frames in parallel. The metadata 430 may include alpha channel information. The metadata 430 may be in, for example, a standard file format (e.g., JSON file). In some embodiments, the metadata 430 may include coordinate information (i.e., identifying position of blocks comprising the detected differences in the video frame) and associated source frame information including, but not limited to, index of diff images which may be used to identify the corresponding diff image, and index of source video frames which may be used to identify the corresponding frame in the original video, block size, video frame rate, etc.

According to some embodiments, the codec may include a threshold-based decision mechanism to adaptively generate additional keyframes throughout the source video. By non-limiting example, if the frame differences surpass a predetermined threshold, the codec stores another keyframe, optimizing video integrity and reducing the final asset size of the compressed file 404. The codec identifies areas of the video with significant changes or complexity and inserts new keyframes in those regions. By dynamically adjusting the keyframe intervals based on the video content, the codec can ensure that the most appropriate keyframes are available for efficient and responsive video playback.

A decoder (e.g., decoding apparatus 314) of a second codec 406 at the player uses the metadata information in metadata 430 to reconstruct frames of the original video input. The player may include an image loading queue configured to determine what images, for example, keyframes and/or diff images, should be loaded into the codec. The image loading queue may preload all related images, keyframes and diff images in preparation for the video reconstruction. Preloading the image information guarantees that the first frame 410 is rendered fast, for example, without waiting for the whole pack of images to arrive at the player. The decoding process begins at the second codec 406 with reconstructing the keyframe by taking the loaded images and metadata and building frames on demand.

As shown in FIG. 4, the second codec 406 may begin by reconstructing the first frame 410. In some embodiments, the second codec 406 reconstructs the closest keyframe. The closest keyframe may serve as a reference point for any subsequent modifications. By non-limiting example, a first frame and a fifth frame of the source video may be identified as keyframes. When rendering the fourth frame, the codec may use the fifth frame as the keyframe. The closest keyframe (i.e., the fifth frame in this example) will have fewer differences compared to the selected frame (i.e., the fourth frame). This enables faster rendering of the selected frame. Using the closest keyframes allows the player to render any image on demand, providing greater flexibility and control over the video playback.

To reproduce any desired frame thereafter, the second codec 406 first takes the reconstructed first frame 410 and then retrieves one or more blocks in the diff images 420. The one or more blocks may correspond to all the blocks in the diff images 420 that include detected changes between the desired frame and the first frame 410. By non-limiting example, based on the metadata (e.g., image information including, e.g., block coordinates), the second codec 406 determines that the differences between the desired frame and the first frame 410 are stored in diff image 420-1 at blocks 422 and 424. Given this information, the second codec 406 extracts block 422 and block 424 from the diff image 420-1 and reconstructs the desired frame. This allows the codec to reproduce the original frame with very little loss of information. By accounting for the block-level differences between frames during compression, the codec can produce artifact-free rendering during decompression. This eliminates common compression artifacts and improves the video playback experience.

The second codec 406 overlays the identified differences from the one or more blocks on the reconstructed first frame 410 to generate a final reconstructed frame. The extracted blocks containing the dynamic elements are precisely positioned on a keyframe using coordinates in metadata 430. In this manner, only modified regions (respective to the reconstructed keyframe) in the desired frame are updated, reducing redundant information processing and painting. By non-limiting example, differences in extracted block 422 and block 424 are overlaid on the reconstructed first frame 410 resulting in the final frame prepared for rendering. The final frame produced by the codec is a decoded frame that serves as a visually accurate representation of the desired frame from the source video. The final frame seamlessly incorporates both static and dynamic elements to ensure a high-quality viewing experience.

According to embodiments, the codec optimizes the decoding process for real-time rendering by leveraging hardware acceleration capabilities. This ensures a smooth and responsive video playback experience across various platforms. The codec may utilize GPU acceleration to enhance the rendering process. The codec performs the processing using the GPU and available application programming interfaces (APIs) on the GPU. By harnessing GPU acceleration, the codec achieves swift and effective frame rendering during video playback without placing undue processing burdens and maintaining optimal rendering performance levels.

The diff images storing differences between frames of the source video enables high precision control at the player during playback. The player may be configured to read the frames per second rate to precisely control the speed and direction of the video playback, enabling features like forward playback, reverse playback, and pausing the content at any frame.

According to embodiments, a user may choose to play the playback video starting at any frame (i.e., point in the video), jump to any frame, forward playback, reverse playback, or the like. In some implementations, the playback control may be tied to a scroll. By non-limiting example, the user may use their mouse to scroll up and down causing a reverse and forward playback effect). In some implementations, the playback may be controlled by mouse position on a display (e.g., display 225) of a player. By non-limiting example, the player may be configured to render a frame closer to the first frame of the source video when the mouse is moving towards the left side of the player screen, play a frame closer to the last frame of the source video when the mouse is moving towards the right side of the player screen, and render interpolated frames for a middle portion of the player screen. In some embodiments, based on the source video, the frame rendering may give the effect of a three-dimensional (3D) object, even though it is ultimately playing a single video file.

Figure 5:
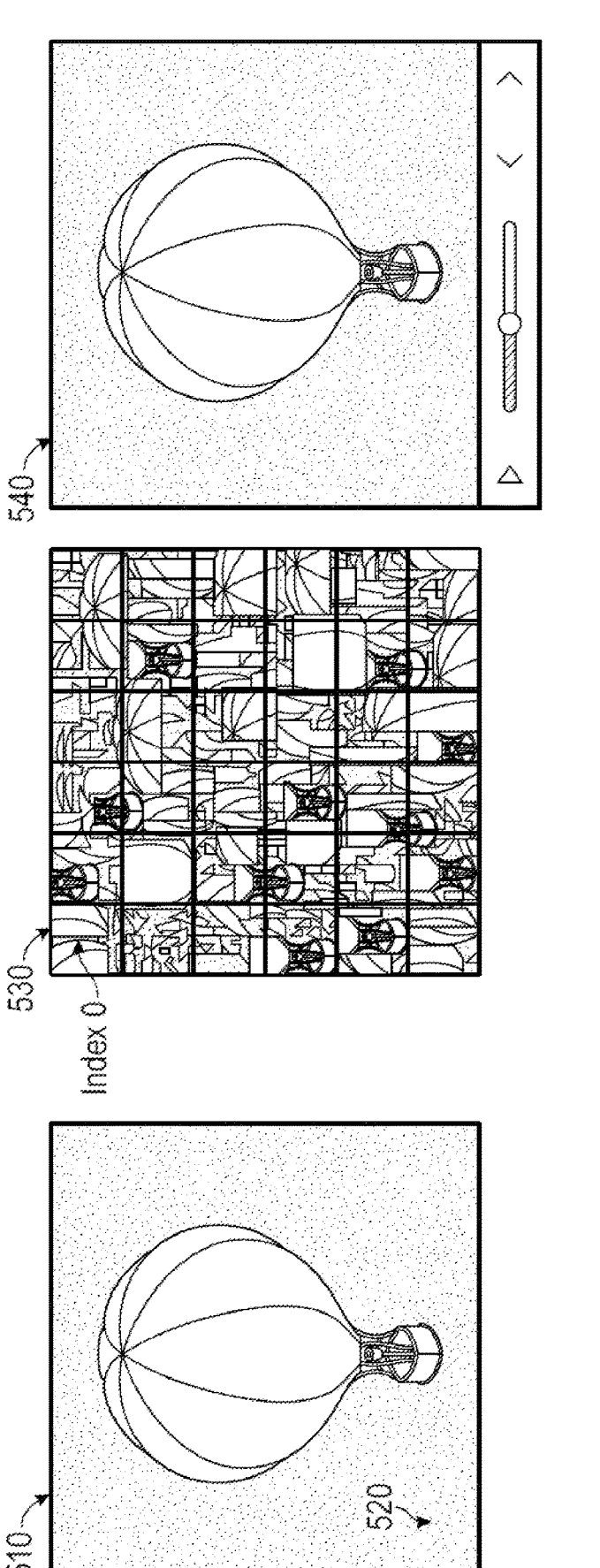
FIG. 5 illustrates exemplary image data provided by the codec at the encoding and decoding side, according to one or more embodiments.

FIG. 5 illustrates exemplary image data provided by the codec at the encoding and decoding side, according to one or more embodiments. The codec may receive an input video (i.e., source video) to be stored and/or transmitted for playback. During encoding, the codec compresses the input video and provides a compressed file (e.g., compressed file 404). The input video may include transparency information which is included as metadata in the compressed file.

The codec determines keyframes that may be used as a reference for subsequent (or previous) frames. The keyframes may correspond to, for example, the first frame in the input video or one or more select frames in the input video. Keyframe 510 may be identified and diff image 530 is generated based therefrom. Diff image 530 includes blocks representing the differences between one or more frames in the input video and the keyframe 510. Block position may be identified by an index/index value. For example, index 0 may identify the position of a first block of the diff image 530.

During decoding, the codec decompresses the compressed file and renders blocks from the diff image 530 given position information included as metadata in the file to generate a reconstructed image 540. The reconstructed image 540 is rendered at a player wherein the user may control and select frames for rendering. The player may include a playback mode selection option. By non-limiting example, the user may switch on/off the playback mode to and from reverse playback. The user may pause, play, reverse, or fast-forward a reconstructed video by selecting a button at a display of the player. The user may jump to any given frame in the reconstructed video at the player.

In some embodiments, the input video may include a transparent background (e.g., background 520 in keyframe 510). By non-limiting example, objects in the frame may be fully opaque and the back group may be fully transparent. In this case, the transparency information (alpha channel data) associated with pixels in the background may be removed during encoding, further reducing the compressed file size, and rendered as a white background. In some implementations, objects in the frame are partially opaque. In some implementations, the objects may be overlaid on a dynamically changing background.

Figure 6B:
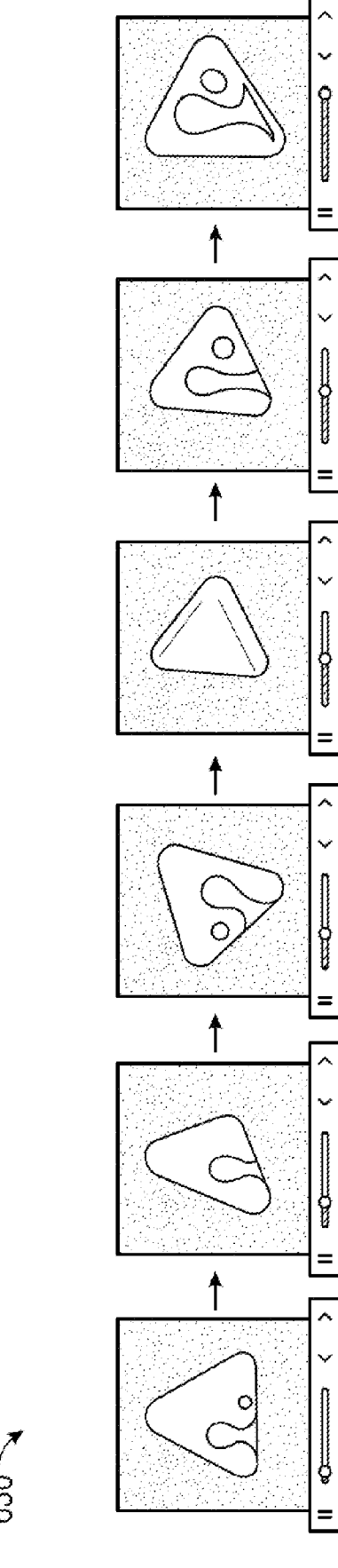

FIGS. 6A-6B illustrate another example of image data provided by the codec at the encoding and decoding side, according to one or more embodiments. Keyframe 610 and diff images 620 are identified at the encoding side and compressed into a compressed file along with metadata. Reconstructed images are generated based on the frames in the image data in the compressed file. FIG. 6B illustrates various reconstructed frames 630 of a source video generated based on keyframe 610 and diff images 620 displayed at a player running the codec, according to one or more embodiments. The object in the source video may be partially opaque and rendered as such in the reconstructed frames 630 through variations in the object's transparency.

Figure 7:
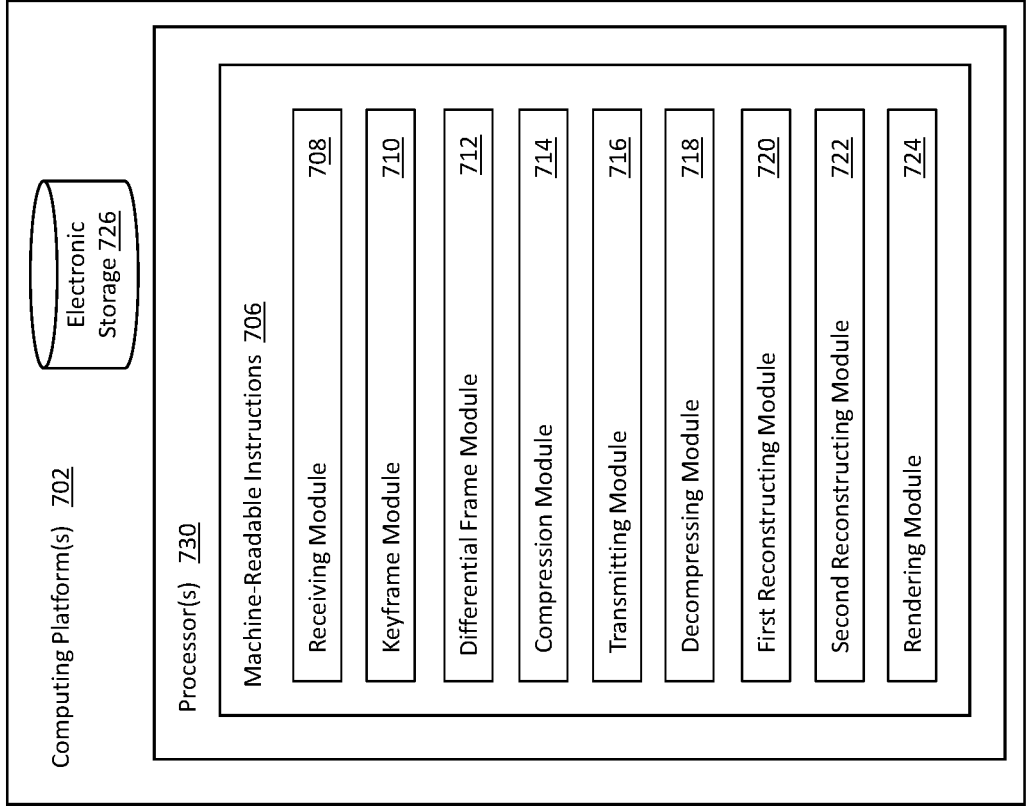
FIG. 7 illustrates a system for video coding, in accordance with one or more implementations.

FIG. 7 is a block diagram illustrating an example computer system 700 (e.g., representing both client and server) with which aspects of the subject technology can be implemented. The system 700 may be configured to encode and decode video data at a codec, according to certain aspects of the disclosure. In some implementations, the system 700 may include one or more computing platforms 702. For example, the computing platform(s) 702 may be configured to execute software algorithm(s) to encode, compress, decompress, and reconstruct video/image data.

The computing platform(s) 702 can maintain or store data, such as in the electronic storage 726, including correlation, contextual data, and metadata used by the computing platform(s) 702. The computing platform(s) 702 may be configured to communicate with one or more remote platforms according to a client/server architecture, a peer-to-peer architecture, and/or other architectures. The remote platform(s) may be configured to communicate with other remote platforms via computing platform(s) 702 and/or according to a client/server architecture, a peer-to-peer architecture, and/or other architectures. Users may access the system 700 which may be hosting one or more of application(s), for example, via remote platform(s). In this way, the remote platform(s) can be configured to cause output of the system 700 on client device(s) of the remote platform(s) with enabled access (e.g., based on analysis by the computing platform(s) 702 according to the stored data).

The computing platform(s) 702 may be configured by machine-readable instructions 706. The machine-readable instructions 706 may be executed by the computing platform (s) to implement one or more instruction modules. The instruction modules may include computer program modules. The instruction modules being implemented may include one or more of receiving module 708, keyframe module 710, differential frame module 712, compression module 714, transmitting module 716, decompressing module 718, first reconstructing module 720, second reconstructing module 722, rendering module 724, and/or other instruction modules.

The receiving module 708 may be configured to receive, at a first client device, a source video including a sequence of frames. The source video may be input at the first client device. A user of the first client device may capture, upload, or create the source video for purposes of transmitting the source video to a player.

The keyframe module 710 may be configured to identify a keyframe in the source video. In some implementations, the source video includes one or more keyframes. By non-limiting example, an initial frame of the source video is identified as the first keyframe. The keyframe module 710 may dynamically adjust keyframe intervals based on the source video. According to some embodiments, the keyframe module 710 may be configured to determine whether a frame difference between a first keyframe and any of the consecutive frames in the sequence of frames exceeds a predetermined threshold. By non-limiting example, the predetermined threshold may include a number of pixel differences between frames. Based on a frame difference exceeding the predetermined threshold, keyframe module 710 may store a second keyframe corresponding to the frame determined to exceed the predetermined threshold.

The differential frame module 712 may be configured to identify differences between the keyframe and consecutive frames in the sequence of frames. The differences are extracted from the consecutive frames and mapped into blocks. Each of the blocks may have variable block sizes.

According to some embodiments, the differential frame module 712 may be further configured to generate an image including the blocks (hereafter referred to as "diff image"). In some embodiments, a subset of the blocks may be grouped into larger render blocks. Each block may be associated with metadata including image information indicating the corresponding frames in the source video (e.g., index value of the frame from the set of frames) and block coordinates pinpointing a position of the identified differences between the keyframe and respective consecutive frame. According to some embodiments, system 700 is further configured to store the block coordinates in the diff image and corresponding source video frame information in a metadata file.

In some embodiments, the source video includes alpha channel information with transparency data. The image information stored as metadata (e.g., in the metadata file) may include alpha channel information.

In some embodiments, the diff image may be a 2D bitmap representing, in the blocks, the pixel differences between the keyframe and consecutive frames in the sequence of frames included in the source video. Each block in the 2D bitmap may correspond to a frame in the source video. The diff image stores the blocks in a compact way to encode and transmit the source video data, optimizing both storage and bandwidth requirements.

The compression module 714 may be configured to compress the diff image, the keyframe, and the metadata into a single compressed file. In some embodiments, the metadata may be the metadata file storing the image information, block coordinates, and/or information about the mapping of the blocks. The compressed file is an encoded file (e.g., generated by the codec 402). The compressed file may begin with the keyframe followed by one or more diff images as well as a metadata file.

The transmitting module 716 may be configured to transmit the compressed file, via a network (e.g., network 150), from the first client device to a second client device for playback. The second client device may be a player configured to play back a reconstructed video generated based on the compressed file. According to some embodiments, the receiving module 708 may be further configured to receive the compressed file (e.g., from the first client device) at the second client device.

The decompressing module 718 may be configured to decompress a received compressed file. The decompressing module 718 may use the metadata stored in the compressed file to preload keyframes and diff images. The keyframes will serve as a reference point for determining modifications in subsequent frames, ultimately forming reconstructed video.

The first reconstructing module 720 may be configured to reconstruct the keyframe from the compressed file. According to some embodiments, the first reconstructing module 720 reconstructs all the keyframes identified in the source video and included in the compressed file.

The second reconstructing module 722 may be configured to reconstruct the consecutive frames in the source video based on the metadata. In some implementations, the metadata includes alpha channel information which is used when reconstructing the consecutive frames. For a target frame in the sequence of frames in the source video, the second reconstructing module 722 may be configured to identify a closest keyframe to the target frame based on image information. For example, the second reconstructing module 722 may select the closest keyframe to a target frame based on an index value (or position information) of the target frame in the sequence of frames and an index value (or position information) of the keyframes in the sequence of frames. Diff images in the compressed file may include blocks that store differences between keyframes and the consecutive frames. Based on the index value, the second reconstructing module 722 may extract one or more blocks corresponding to the target frame using block coordinates in the metadata. The block coordinates map the differences in the diff images to the consecutive frame.

According to some embodiments, the second reconstructing module 722 may be further configured to position the blocks on the closet keyframe using the block coordinates and image information. In this manner, regions of the closest keyframe that are modified in the target frame are updated by overplaying the differences onto the closest keyframe to reconstruct the target frame. A sequence of reconstructed frames is used to generate the reconstructed video from the source video.

The rendering module 724 may be configured to render reconstructed frames during playback. In some embodiments, the rendering module 724 may utilize GPU acceleration for rendering the reconstructed frames (e.g., the reconstructed keyframes and reconstructed consecutive frames). The rendering module 724 renders frames over time and may be configured to perform reverse playback, forward playback, and/or selected frame-based playback (e.g., jumping to any selected frame) functions.

In some implementations, the computing platform(s) 702, the remote platform(s), and/or the external resources may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 702, the remote platform (s), and/or the external resources may be operatively linked via some other communication media.

A given remote platform may include client computing devices, such as the client device 110 or second client device, which may each include one or more processors configured to execute computer program modules (e.g., the instruction modules). The computer program modules may be configured to enable an expert or user associated with the given remote platform to interface with the system 700 and/or external resources, and/or provide other functionality attributed herein to remote platform(s). By way of non-limiting example, a given remote platform and/or a given computing platform 702 may include one or more of a server, a desktop computer, a laptop computer, a handheld computer, a tablet computing platform, a NetBook, a Smartphone, a gaming console, and/or other computing platforms. The external resources may include sources of information outside of the system 700, external entities participating with the system 700, and/or other resources.

Computing platform(s) 702 may include electronic storage 726, one or more processors 730, and/or other components. Computing platform(s) 702 may include communication lines, or ports to enable the exchange of information with a network and/or other computing platforms. Illustration of the computing platform(s) 702 in FIG. 7 is not intended to be limiting. The computing platform(s) 702 may include a plurality of hardware, software, and/or firmware components operating together to provide the functionality attributed herein to the computing platform(s) 702. For example, the computing platform(s) 702 may be implemented by a cloud of computing platforms operating together as the computing platform(s) 702.

Electronic storage 726 may comprise non-transitory storage media that electronically stores information. The electronic storage media of electronic storage 726 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 726 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 726 may include one or more virtual storage resources (e.g., cloud storage, a virtual private network, and/or other virtual storage resources). Electronic storage 726 may store software algorithms, information determined by processor(s) 730, information received from computing platform(s) 702, information received from remote platform(s), and/or other information that enables computing platform(s) 702 to function as described herein.

Processor(s) 730 may be configured to provide information processing capabilities in computing platform(s) 702. As such, processor(s) 730 may include one or more of a digital processor, an analog processor, a digital circuit designed to process information, an analog circuit designed to process information, a state machine, and/or other mechanisms for electronically processing information. Although processor(s) 730 is shown in FIG. 7 as a single entity, this is for illustrative purposes only. In some implementations, processor(s) 730 may include a plurality of processing units. These processing units may be physically located within the same device, or processor(s) 730 may represent processing functionality of a plurality of devices operating in coordination. Processor(s) 730 may be configured to execute modules 708, 710, 712, 714, 716, 718, 720, 722 and/or 724, and/or other modules. Processor(s) 730 may be configured to modules 708, 710, 712, 714, 716, 718, 720, 722 and/or 724, and/or other modules by software; hardware; firmware; some combination of software, hardware, and/or firmware; and/or other mechanisms for configuring processing capabilities on processor(s) 730. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, 714, 716, 718, 720, 722 and/or 724 are illustrated in FIG. 7 as being implemented within a single processing unit, in implementations in which processor(s) 730 includes multiple processing units, one or more of modules 708, 710, 712, 714, 716, 718, 720, 722 and/or 724 may be implemented remotely from the other modules. The description of the functionality provided by the different modules 708, 710, 712, 714, 716, 718, 720, 722 and/or 724 described below is for illustrative purposes, and is not intended to be limiting, as any of modules 708, 710, 712, 714, 716, 718, 720, 722 and/or 724 may provide more or less functionality than is described. For example, one or more of modules 708, 710, 712, 714, 716, 718, 720, 722 and/or 724 may be eliminated, and some or all of its functionality may be provided by other ones of modules 708, 710, 712, 714, 716, 718, 720, 722 and/or 724. As another example, processor(s) 730 may be configured to execute one or more additional modules that may perform some or all of the functionality attributed below to one of modules 708, 710, 712, 714, 716, 718, 720, 722 and/or 724.

The techniques described herein may be implemented as method(s) that are performed by physical computing device (s); as one or more non-transitory computer-readable storage media storing instructions which, when executed by computing device(s), cause performance of the method(s); or as physical computing device(s) that are specially configured with a combination of hardware and software that causes performance of the method(s).

FIG. 8 illustrates an example flow diagram (e.g., process 800) for encoding video data, according to certain aspects of the disclosure. The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 8 may be performed by a processor circuit executing instructions stored in a memory circuit, in a client device, a remote server or a database, communicatively coupled through a network (e.g., processors 212, memories 220, client device 110, server 130, databases 152, computing platform(s) 702 and network 150). In some embodiments, one or more of the steps in process 800 may be performed by one or more of the modules 708, 710, 712, 714, 716, 718, 720, 722 and/or 724.

Although FIG. 8 shows example blocks of the process 800, in some implementations, the process 800 may include additional blocks, fewer blocks, different blocks, or differently arranged blocks than those depicted in FIG. 8. For explanatory purposes, the steps of the example process 800 are described herein as occurring in serial, or linearly. However, multiple instances of the example process 800 may occur in parallel, in a different order, simultaneously, quasi-simultaneously or overlapping in time.

At step 802, the process 800 may include identifying a first keyframe in a source video. The source video may be received, captured, generated, or the like, at a first client device. The source video may be encoded at the first client device for purposes of storing or transmitting the source video to a second client device for playback.

At step 804, the process 800 may include identifying differences between the first keyframe and the consecutive frames in the source video and extracting the differences from the consecutive frames. At step 806, the process 800 may include mapping the extracted differences between the first keyframe and consecutive frames into blocks. According to some embodiments, the process 800 may include grouping subsets of the blocks into larger blocks for rendering.

At step 808, the process 800 may include generating an image including the blocks. The image may be a 2D bitmap representing, in the blocks, the differences between the first keyframe and the consecutive frames included in the source video.

According to embodiments, the source video may include one or more keyframes. Keyframe intervals may be dynamically adjusted based on the source video. According to some embodiments, the process 800 may further include determining whether a frame difference between the first keyframe and at least one of the consecutive frames in the sequence of frames exceeds a predetermined threshold. The process 800 may further include storing a second keyframe corresponding to the at least one consecutive frame determined to exceed the predetermined threshold.

At step 810, the process 800 may include storing coordinates of the blocks in the image and corresponding source video information as metadata. According to some embodiments, the source video includes alpha channel information, and the alpha channel information is stored as metadata. The metadata may be included in a metadata file. The source video information may include index values associated with each of the frames in the source video. In some implementations, each of the blocks corresponds to a frame in the source video and stores the differences identified between the frame and a keyframe.

Figure 9:
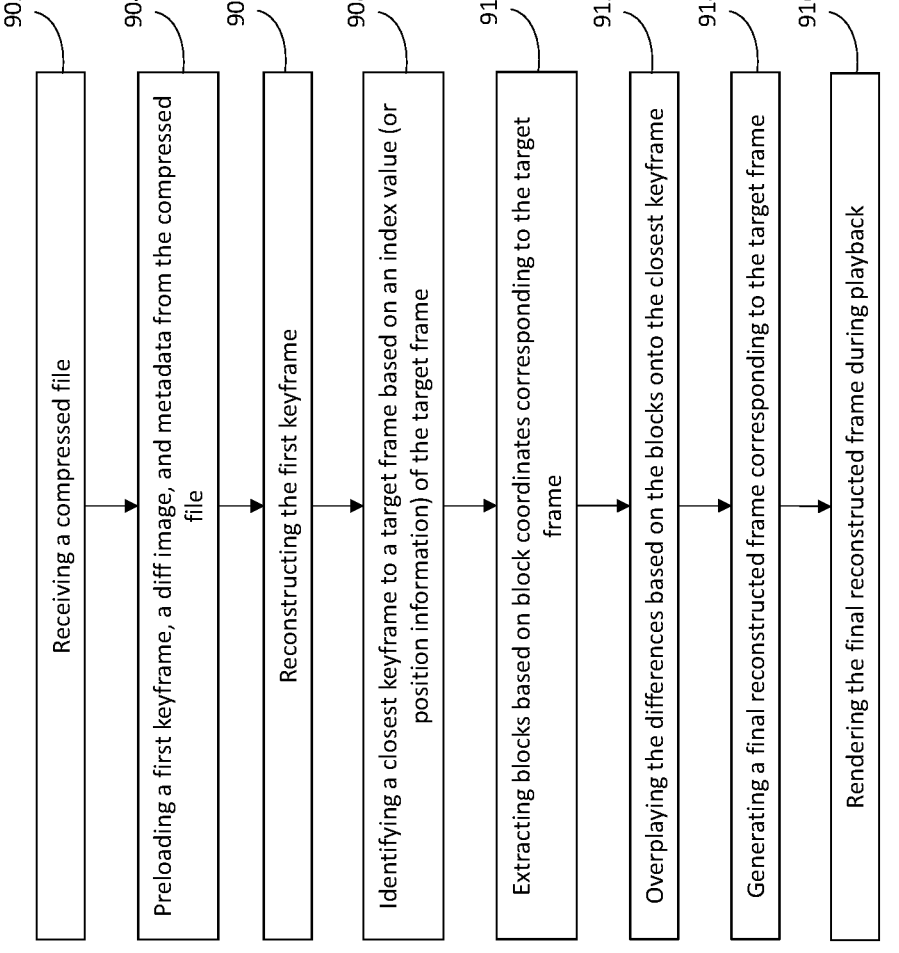
FIG. 9 is an example flow diagram for decoding video data, according to certain aspects of the present disclosure.

FIG. 9 illustrates an example flow diagram (e.g., process 900) for decoding video data, according to certain aspects of the disclosure. The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 9 may be performed by a processor circuit executing instructions stored in a memory circuit, in a client device, a remote server or a database, communicatively coupled through a network (e.g., processors 212, memories 220, client device 110, server 130, databases 152, computing platform(s) 702 and network 150). In some embodiments, one or more of the steps in process 900 may be performed by one or more of the modules 708, 710, 712, 714, 716, 718, 720, 722 and/or 724.

Although FIG. 9 shows example blocks of the process 900, in some implementations, the process 900 may include additional blocks, fewer blocks, different blocks, or differently arranged blocks than those depicted in FIG. 9. For explanatory purposes, the steps of the example process 900 are described herein as occurring in serial, or linearly. However, multiple instances of the example process 900 may occur in parallel, in a different order, simultaneously, quasi-simultaneously or overlapping in time.

At step 902, the process 900 may include receiving a compressed file including at least a first keyframe, diff image, and metadata. At step 904, the process 900 includes preloading the first keyframe, the diff image, and the metadata. At step 906, the process 900 includes reconstructing the first keyframe.

At step 908, the process 900 includes identifying a closest keyframe to a target frame based on an index value (or position information) of the target frame. The index value and/or position information may be included as metadata in the compressed file.

At step 910, the process 900 includes extracting blocks based on block coordinates corresponding to the target frame. The extracted blocks store differences between the closest keyframe and the target frame. Block coordinates in the diff frames may be included as metadata in the compressed file.

At step 912, the process 900 includes overplaying the differences based on the blocks onto the closest keyframe.

At step 914, the process 900 includes generating a final reconstructed frame corresponding to the target frame based on the modifications made in step 912.

At step 916, the process 900 includes rendering the final reconstructed frame during playback. Steps 908-916 may be performed for each (or any) indexed frame to reconstruct the source video. The frames are rendered over time, and as such may be played back in reverse, forward, and/or selected based on frame.

Hardware Overview

FIG. 10 is a block diagram illustrating an exemplary computer system 1000 with which the client and server of FIGS. 1-9, and method(s) described herein can be implemented. In certain aspects, the computer system 1000 may be implemented using hardware or a combination of software and hardware, either in a dedicated server, or integrated into another entity, or distributed across multiple entities. Computer system 1000 may include a desktop computer, a laptop computer, a tablet, a phablet, a smartphone, a feature phone, a server computer, or otherwise. A server computer may be located remotely in a data center or be stored locally.

Computer system 1000 includes a bus 1008 or other communication mechanism for communicating information, and a processor 1002 (e.g., processors 212) coupled with bus

1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 220), such as a Random Access Memory (RAM), a Flash Memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications module 218) include networking interface cards, such as Ethernet cards and modems. In certain aspects, input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client device and server can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hardwired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method, performed by at least one processor, for encoding video data, the method comprising:

identifying a first keyframe in a source video;

mapping differences between the first keyframe and consecutive frames in the source video into blocks;

generating an image including the blocks, wherein each block represents a visual encoding of pixel-level temporal differences between the first keyframe and the consecutive frames, arranged in a spatial grid independent of source video frame coordinates;

storing coordinates of the blocks in the image and corresponding source video information as metadata; and compressing the image, the first keyframe, and the metadata into a compressed file.

2. The computer-implemented method of claim 1, further comprising:

receiving the source video at a first client device, wherein the compressed file is transmitted from the first client device to a second client device for playback.

3. The computer-implemented method of claim 1, further comprising:

identifying the differences between the first keyframe and the consecutive frames; and extracting the differences from the consecutive frames.

4. The computer-implemented method of claim 1, further comprising grouping subsets of the blocks into larger render blocks.

5. The computer-implemented method of claim 1, wherein the image is a two-dimensional (2D) bitmap representing, in the blocks, differences between keyframes and a plurality of frames included in the source video.

6. The computer-implemented method of claim 1, further comprising:

determining whether a frame difference between the first keyframe and at least one consecutive frame exceeds a predetermined threshold; and storing a second keyframe corresponding to the at least one consecutive frame determined to exceed the predetermined threshold.

7. The computer-implemented method of claim 1, wherein the source video includes alpha channel information, further comprising storing the alpha channel information in the metadata.

8. The computer-implemented method of claim 1, wherein the source video information includes index values associated with frames in the source video, each of the blocks corresponding to a frame in the source video.

9. The computer-implemented method of claim 1, further comprising dynamically adjusting keyframe intervals based on the source video.

10. The computer-implemented method of claim 1, wherein the source video is associated with a plurality of images including compact blocks of image data and each of the plurality of images is associated with one or more keyframes.

11. A system for encoding video data, the system comprising:

one or more processors; and a memory storing instructions which, when executed by the one or more processors, cause the system to:

identify a first keyframe in a source video;

map differences between the first keyframe and consecutive frames in the source video into blocks;

generate an image including the blocks, wherein each block represents a visual encoding of pixel-level temporal differences between the first keyframe and the consecutive frames, arranged in a spatial grid independent of source video frame coordinates;

store coordinates of the blocks in the image and corresponding source video information as metadata; and compress the image, the first keyframe, and the metadata into a compressed file, wherein the compressed file is transmitted to a player for playback.

12. The system of claim 11, wherein the one or more processors further execute instructions to:

identify the differences between the first keyframe and the consecutive frames; and extract the differences from the consecutive frames.

13. The system of claim 11, wherein the one or more processors further execute instructions to group subsets of the blocks into larger render blocks.

14. The system of claim 11, wherein the image is a two-dimensional (2D) bitmap representing, in the blocks, differences between keyframes and a plurality of frames included in the source video.

15. The system of claim 11, wherein the one or more processors further execute instructions to:

determine whether a frame difference between the first keyframe and at least one consecutive frame exceeds a predetermined threshold; and store a second keyframe corresponding to the at least one consecutive frame determined to exceed the predetermined threshold.

16. The system of claim 11, wherein the source video includes alpha channel information, and the one or more processors further execute instructions to store the alpha channel information in the metadata.

17. The system of claim 11, wherein the source video information includes index values associated with frames in the source video, each of the blocks corresponding to a frame in the source video.

18. The system of claim 11, wherein the one or more processors further execute instructions to dynamically adjust keyframe intervals based on the source video.

19. The system of claim 11, wherein the source video is associated with a plurality of images including compact blocks of image data and each of the plurality of images is associated with one or more keyframes.

20. A non-transient computer-readable storage medium having instructions embodied thereon, the instructions being executable by one or more processors to perform a method for encoding video data and cause the one or more processors to:

identify a first keyframe in a source video;

determine differences between the first keyframe and consecutive frames in the source video:

map differences between the first keyframe and the consecutive frames into blocks;

generate an image including the blocks, wherein each block represents a visual encoding of pixel-level temporal differences between the first keyframe and the consecutive frames, arranged in a spatial grid independent of source video frame coordinates;

store coordinates of the blocks in the image and corresponding source video information as metadata; and compress the image, the first keyframe, and the metadata into a single compressed file, wherein the compressed file is transmitted to a player for playback.

* * * * *